(12) United States Patent
Oliva

(10) Patent No.: US 6,324,822 B1
(45) Date of Patent: Dec. 4, 2001

(54) METHOD OF DETECTING FOREIGN OBJECTS IN A HARVESTING MACHINE

(75) Inventor: Christoph Oliva, Bad Saulgau (DE)

(73) Assignee: Case Harvesting Systems GmbH, Neustadt (DE)

(*) Notice: Subject to any disclaimer, the term of this patent is extended or adjusted under 35 U.S.C. 154(b) by 0 days.

(21) Appl. No.: 09/497,975

(22) Filed: Feb. 4, 2000

(30) Foreign Application Priority Data

Feb. 5, 1999 (DE) .............................. 199 04 626

(51) Int. Cl.$^7$ .................................................. A01D 75/18
(52) U.S. Cl. .................................. 56/10.2 J; 56/DIG. 15; 460/2
(58) Field of Search .................................. 56/10.2 J, 158, 56/295, 296, 257, DIG. 15, 24, 10.2 R; 460/2, 3; 340/684, 501

(56) References Cited

U.S. PATENT DOCUMENTS

| | | | |
|---|---|---|---|
| 4,335,565 | * 6/1982 | Knepper et al. | 460/2 |
| 4,353,199 | 10/1982 | Chow . | |
| 4,720,963 | * 1/1988 | Weiss et al. | 56/10.2 J |
| 4,776,154 | * 10/1988 | Weiss et al. | 56/10.2 J |
| 5,873,227 | * 2/1999 | Arner | 56/14.6 |
| 5,901,535 | * 5/1999 | Dückinghaus et al. | 56/10.2 G |
| 5,921,071 | * 7/1999 | Paquet et al. | 56/16.6 |
| 6,105,347 | * 8/2000 | Behnke | 56/10.2 J |

FOREIGN PATENT DOCUMENTS

| | | |
|---|---|---|
| 110 413 | 3/1973 | (DE) . |
| 116 553 | 4/1974 | (DE) . |
| 111 534 | 6/1974 | (DE) . |
| 114 893 | 10/1974 | (DE) . |
| 296 16 473 | 1/1997 | (DE) . |
| 217 418 | 4/1987 | (EP) . |
| 217 417 | 4/1990 | (EP) . |

\* cited by examiner

*Primary Examiner*—Robert E. Pezzuto
*Assistant Examiner*—Árpád F. Kovács
(74) *Attorney, Agent, or Firm*—Herbert Dubno

(57) ABSTRACT

A crop stream passes longitudinally at a feed velocity varying relative to a predetermined feed velocity in a harvesting machine between conveyor elements which transversely compress the stream and at least one of which is transversely deflectable. A stone in the stream is detected by continuously producing an output corresponding to the transverse deflection of the one conveyor element per unit of time, continuously monitoring the feed velocity and producing an output corresponding to actual feed velocity, and establishing for the predetermined feed velocity a predetermined threshold value for the transverse-deflection output. In addition for actual feed velocities different from the predetermined feed velocity respective threshold values are established that are equal to the predetermined threshold value multiplied by the quotient of the actual feed velocity squared divided by the predetermined feed velocity squared. Action—sounding an alarm, stopping the machine, and/or ejecting the stone—is taken when the transverse-deflection output exceeds the threshold value for the respective actual feed velocity.

12 Claims, 2 Drawing Sheets

METHOD OF DETECTING FOREIGN OBJECTS IN A HARVESTING MACHINE

FIELD OF THE INVENTION

The present invention relates to method of detecting foreign objects in the crop stream of a harvesting machine.

BACKGROUND OF THE INVENTION

A standard harvesting machine such as a field chopper has a pickup head that cuts a standing crop or picks up a windrow of previously cut crop, for instance corn, wheat, or soy, and a conveyor mechanism that feeds a stream of the cut crop back through treatment devices that typically crush and comminute it. The conveyor mechanism normally includes at least two rollers that are oppositely driven.

In order to protect the machinery from hard objects such as stones that might be entrained in the crop stream, one of the rollers is normally movably mounted so that it can be deflected against a spring force away from the other roller. Thus when a hard object is drawn in, the one roller will deflect laterally and allow it to pass without damage to the conveyor rollers.

While such a system protects the conveyor rollers themselves from harm, it does not protect the downstream equipment which is equally likely to be damaged by contact with the hard object. Therefore systems are provided that allow the equipment to be stopped or shut down when a hard object is encountered by the intake conveyor.

In East German patent 110,413 and 116,553 of Wehsely mechanical feelers are provided between the feed rollers that detect hard objects and operate mechanism for sorting out any hard object. Such systems require a relatively slow feed rate that greatly reduces throughput of the machine. In addition they are expensive and failure prone.

Another solution proposed in East German patent 114,893 of Wehsely proposes directing a bright light through the crop stream upstream of the feed rollers, since the crop is normally somewhat translucent and most hard objects are solidly opaque. This system requires that the light be very bright, so that when used with a dry crop like straw there is a severe danger of fire, making the system unsuitable for much field use.

In East German patent 111,534 also of Wehsely the pickup head's transverse conveyor is provided with a plurality of electronic sensors that if physically contacted by a hard object emit a signal that is used to stop the system and even eject the object. The problem with this system is that the foreign object is often masked in the crop stream so that it does not contact the sensors which, instead, remain in contact with the relatively soft crop stream.

U.S. Pat. No. 4,353,199 of Chow describes a harvesting-machine stone detector wherein the feed rollers are provided on their inner surfaces with piezoelectric acoustic sensors that produce a characteristic signal when the roller is struck by a hard object such as a stone. The resultant electrical signal is processed so that when a stone is detected the machine can be shut down or the crop stream can be temporarily diverted out of the machine to eject the stone. The orbiting piezoelectric sensors must be connected through failure-prone commutator rings with the processing circuit so that there is frequent failure of transmission of the signal to the circuit. Furthermore when the stone is well cushioned in the crop stream the sensors will not detect it.

German utility model 296 16 473 of Weiss describes a system where one of the intake rollers can be deflected transversely to the crop stream against the force of a fluid-type shock absorber. A pressure sensor in the absorber can detect the sudden change in pressure caused when a stone wedges between the rollers and forces them abruptly apart. This pressure sensor produces an output that can be processed to trigger stopping of the machine or ejection of the stone when the output of the sensor exceeds a predetermined threshold, indicating that a stone is trying to get between the rollers. The problem with this system is that it is only applicable to high-end machines with pneumatically or hydraulically damped feed rollers. Furthermore it is possible for a sudden pressure peak to be created by something other than a potentially dangerous stone, so that the system gives frequent false alarms.

Further such systems are described in European patent publications 0,217,417 and 0,217,418 both of Weiss which measure the acceleration of the feed rollers. The signal is processed, however, identically as in the above cited utility model, producing the disadvantage that, when the crop stream is moving slowly for fine chopping of the crop, a stone can get past the rollers while when the crop is moving rapidly there are frequent false alarms.

OBJECTS OF THE INVENTION

It is therefore an object of the present invention to provide an improved method of detecting foreign bodies, hereinafter stones, in the crop stream of a harvesting machine.

Another object is the provision of such an improved method of detecting foreign bodies in the crop stream of a harvesting machine which overcomes the above-given disadvantages, that is which works at all operational speeds of the machine.

SUMMARY OF THE INVENTION

A crop stream passes longitudinally at a feed velocity varying relative to a predetermined feed velocity in a harvesting machine between conveyor elements which transversely compress the stream and at least one of which is transversely deflectable. A stone in the stream is detected according to the invention by continuously producing an output corresponding to the transverse deflection of the one conveyor element per unit of time, continuously monitoring the feed velocity and producing an output corresponding to actual feed velocity, and establishing for the predetermined feed velocity a predetermined threshold value for the transverse-deflection output. In addition for actual feed velocities different from the predetermined feed velocity respective threshold values are established that are equal to the predetermined threshold value multiplied by the quotient of the actual feed velocity squared divided by the predetermined feed velocity squared. Action—sounding an alarm, stopping the machine, and/or ejecting the stone—is taken when the transverse-deflection output exceeds the threshold value for the respective actual feed velocity.

The harvesting machine that moves over the field either cuts the crop or picks up a windrow of previously cut crop, forming it into the stream that is fed through the conveyor assembly that normally is formed by a plurality of transverse rollers. Thence the crop stream is normally comminuted and blown into a trailing wagon or adjacent vehicle. The conveyor rollers compress and compact the crop stream. Since, however, the crop is not perfectly uniform on the field, the crop stream will inherently vary in thickness so the movable conveyor elements will bounce up and down. The system of this invention measures this displacement of the movable conveyor elements with respect to time and produces an output $M_B$ corresponding thereto.

If a stone or other hard foreign body finds its way into the crop stream it will form an incompressible element in the crop stream and the deflectable conveyor element(s) will be rapidly pushed to the side, normally upward. According to the invention, however, this raw value of $M_B$ is not used alone to determine whether or not action is to be taken. The reason for this is that when the crop stream is moving rapidly through the conveyor assembly, even acceptable lumps in the crop stream can create sudden displacement peaks that can exceed a standard threshold value. Similarly if the crop stream is moving slowly an actual foreign body that should be cause for alarm might not move the conveyor elements sufficiently to exceed the threshold.

Thus in accordance with the invention the velocity of the crop stream is taken into account. A standard response threshold $S_D$ is set for a standard crop-feed velocity $V_D$. Then according to the invention an instantaneous threshold $S$ is determined for any speed $V$ that is different from $V_D$ according to the formula:

$$S = S_D(V^2/V_D^2).$$

This instantaneous threshold can be predetermined for a range of speeds or calculated on the fly, that is as the actual value for the feed velocity changes.

According to a feature of the invention the predetermined feed velocity is equal to a minimal feed velocity of the crop stream so that the predetermined feed velocity can be equated to a value of 1 and the actual feed velocities are converted to values bearing the same ratio to 1 as the respective actual feed velocities bear to the predetermined feed velocity so that the threshold values for actual feed velocities different from the predetermined feed velocity are proportional to the respective actual feed velocities. In effect the denominator $V_D^2$ is turned into 1, substantially simplifying the math.

Alternately according to the invention the instantaneous actual feed-velocity signal $M_B$ is multiplied by a factor equal to the quotient of the square of the standard crop-feed velocity $V_D$ divided by the square of the actual crop feed speed $V$, according to the formula:

$$M_{Badjusted} = M_B(V_D^2/V^2)$$

and this $M_{Badjusted}$ is itself compared to a fixed threshold value $S_D$.

Either way the velocity is taken into account so that the system will efficiently detect a stone in the crop stream. In effect sensitivity is reduced at high crop speeds and increased at low crop speeds.

The threshold values established for actual feed velocities are calculated according to the invention as the actual feed velocity changes. In addition the output corresponding to transverse deflection is acceleration of the one conveyor element.

The one conveyor element is supported on a machine frame by means of a fluid-filled shock absorber and the output in accordance with the invention corresponding to transverse deflection is determined by measuring pressure in the shock absorber. The outputs are electrical signals and the one conveyor element is pivotally mounted on a machine frame.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
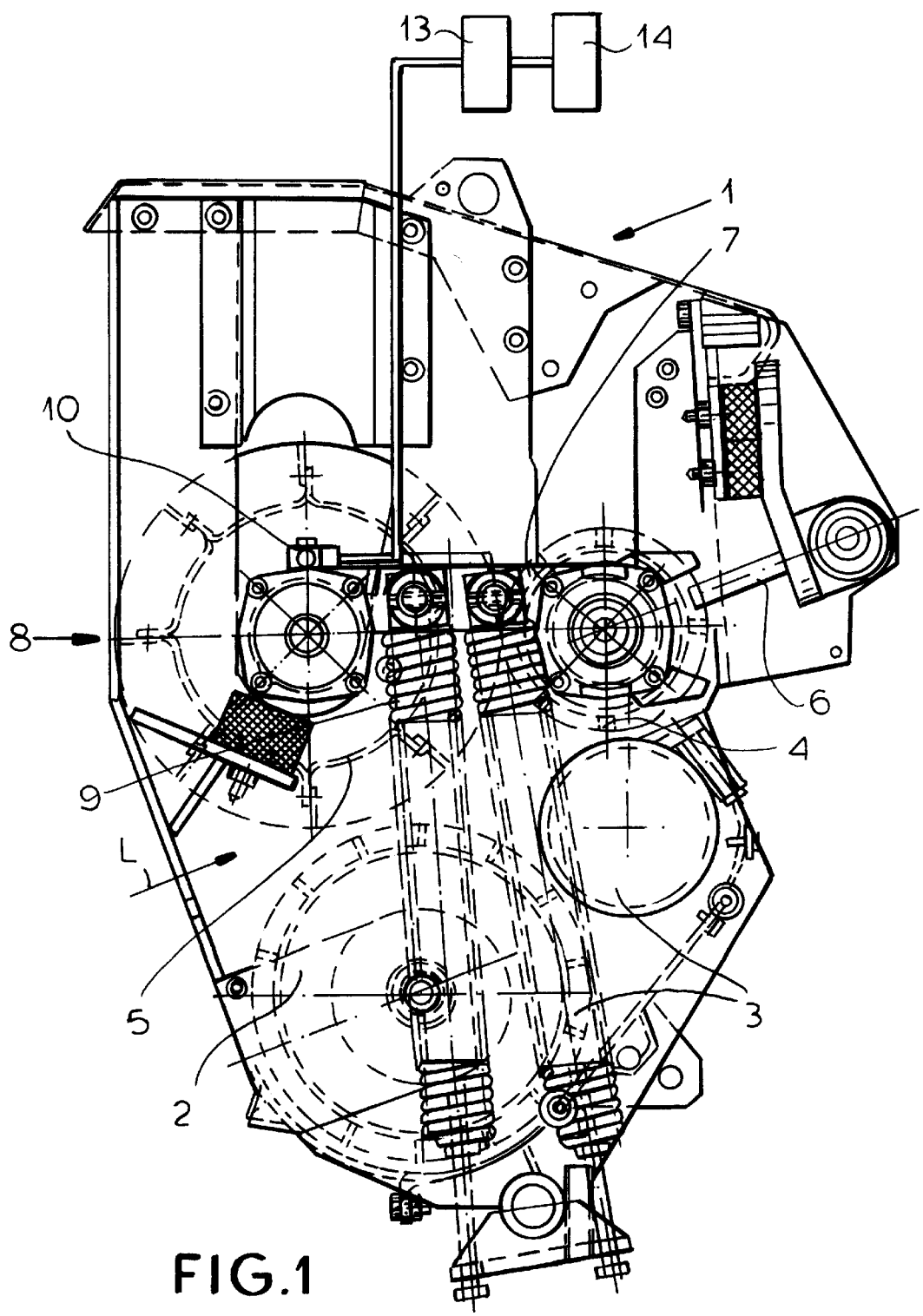
FIG. 1 is a partly sectional side view of conveyor elements of a harvesting machine employing the method of the invention.

As seen in FIG. 1 a harvesting-machine conveyor assembly 1 has a frame 2 on which are supported lower feed rollers 3 rotatable about fixed axes on the frame 2 and upper feed rollers 4 and 5 of an upper roller assembly that can move vertically on the frame 2. The roller 5 is mounted on an arm 6 pivoted about the axis of the roller 4 which in turn is mounted on an arm 7 pivoted on the frame 2 to form a movable upper roller subassembly 8. Together the rollers 3, 4, and 5 pull in a stream of crop in a longitudinal direction L. Springs 9 urge the upper movable roller subassembly 8 downward toward the lower rollers 3 and as illustrated schematically in FIG. 2 a pneumatic shock absorber 11 may also or alternately be used for this biasing.

According to the invention an accelerometer 10 is coupled to the movable upper roller assembly 8 to generate an output representing the acceleration of these parts which of course is a function of their displacement with respect to time squared. This output is fed to a processing unit 13 and thence to a unit 14 serving to sound an alarm, stop the machine, and/or eject the crop stream from the machine before it can damage any downstream chopping equipment.

Figure 2:
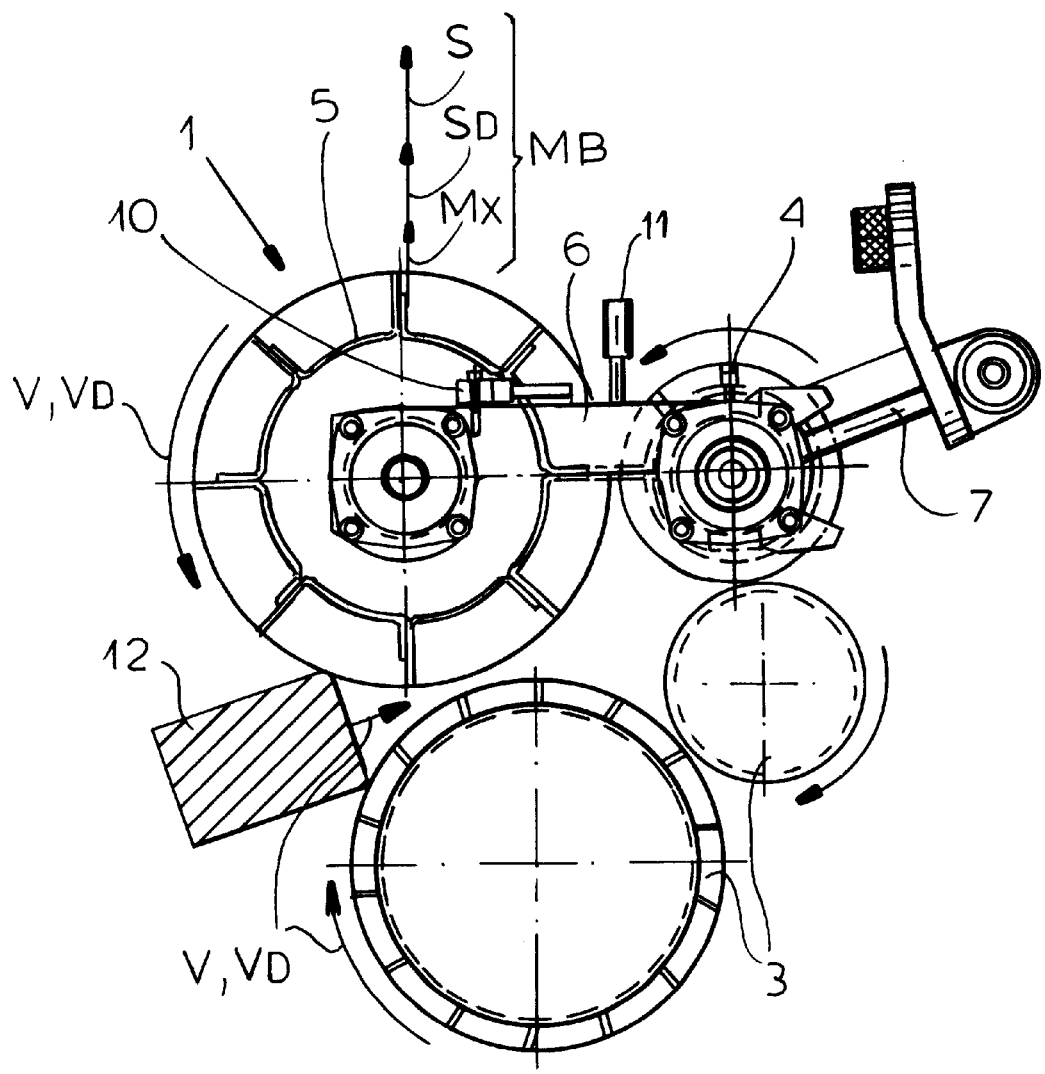
FIG. 2 is a more schematic view of the parts of FIG. 1 illustrating the method.

FIG. 2 shows how when a hard foreign object 12 is forced between the rollers 5 and 3, the roller 5 will be deflected upward. This produces a signal $M_B$ which is either adjusted for velocity and compared with a fixed threshold or which is compared with a fixed threshold adjusted for velocity as described above.

I claim:

1. A method of detecting a stone in a crop stream passing longitudinally at a feed velocity varying relative to a predetermined feed velocity in a harvesting machine between conveyor elements which transversely compress the stream and at least one of which is transversely deflectable, the method comprising the steps of:

continuously producing an output corresponding to the transverse deflection of the one conveyor element per unit of time;

continuously monitoring the feed velocity and producing an output corresponding to actual feed velocity;

establishing for the predetermined feed velocity a predetermined threshold value for the transverse-deflection output;

establishing for actual feed velocities different from the predetermined feed velocity respective threshold values equal to the predetermined threshold value multiplied by the quotient of the actual feed velocity squared divided by the predetermined feed velocity squared; and taking action when the transverse-deflection output exceeds the threshold value for the respective actual feed velocity.

2. The stone-detecting method defined in claim 1 wherein the predetermined feed velocity is equal to a minimal feed velocity of the crop stream, the method further comprising the steps of:

equating the predetermined feed velocity to a value of 1; and converting the actual feed velocities to values bearing the same ratio to 1 as the respective actual feed velocities bear to the predetermined feed velocity, whereby the threshold values for actual feed velocities different from the predetermined feed velocity are proportional to the respective actual feed velocities.

3. The stone-detecting method defined in claim 1 wherein the output corresponding to transverse deflection is acceleration of the one conveyor element.

4. The stone-detecting method defined in claim 1 wherein the one conveyor element is supported on a machine frame by means of a fluid-filled shock absorber, the output corresponding to transverse deflection being determined by measuring pressure in the shock absorber.

5. The stone-detecting method defined in claim 1 wherein the outputs are electrical signals.

6. The stone-detecting method defined in claim 1 wherein the one conveyor element is pivotally mounted on a machine frame.

7. A method of detecting a stone in a crop stream passing longitudinally at a feed velocity varying relative to a predetermined feed velocity in a harvesting machine between conveyor elements which transversely compress the stream and at least one of which is transversely deflectable, the method comprising the steps of:

continuously producing an output corresponding to the transverse deflection of the one conveyor element per unit of time;

continuously monitoring the feed velocity and producing an output corresponding to actual feed velocity;

establishing for the predetermined feed velocity a predetermined threshold value for the transverse-deflection output;

multiplying the outputs corresponding to the actual feed velocities different from the predetermined feed velocity by a factor equal to the quotient of the predetermined feed velocity squared divided by the actual feed velocity squared; and taking action when the transverse-deflection output exceeds the threshold value for the respective actual feed velocity.

8. The stone-detecting method defined in claim 7 wherein the output corresponding to transverse deflection is acceleration of the one conveyor element.

9. The stone-detecting method defined in claim 7 wherein the one conveyor element is supported on a machine frame by means of a fluid-filled shock absorber, the output correspond ming to transverse deflection being determined by measuring pressure in the shock absorber.

10. The stone-detecting method defined in claim 7 wherein the outputs are electrical signals.

11. The stone-detecting method defined in claim 7 wherein the one conveyor element is pivotally mounted on a machine frame.

12. A method of detecting a stone in a crop stream passing longitudinally at a feed velocity varying relative to a predetermined feed velocity in a harvesting machine between conveyor elements which transversely compress the stream and at least one of which is transversely deflectable and supported on a machine frame by means of a fluid-filled shock absorber, the method comprising the steps of:

continuously producing an output corresponding to the transverse deflection of the one conveyor element per unit of time by measuring pressure in the shock absorber;

continuously monitoring the feed velocity and producing an output corresponding to actual feed velocity;

establishing for the predetermined feed velocity a predetermined threshold value for the transverse-deflection output;

multiplying the outputs corresponding to the actual feed velocities different from the predetermined feed velocity by a factor equal to the quotient of the predetermined feed velocity squared divided by the actual feed velocity squared; and taking action when the transverse-deflection output exceeds the threshold value for the respective actual feed velocity.

\* \* \* \* \*